United States Patent [19]

Yoda et al.

[11] 4,346,405

[45] Aug. 24, 1982

[54] VISUAL INFORMATION PROCESSING APPARATUS

[75] Inventors: Haruo Yoda, Hinodemachi; Jun Motoike, Hachioji, both of Japan

[73] Assignee: Hitachi, Ltd., Tokyo, Japan

[21] Appl. No.: 195,859

[22] Filed: Oct. 10, 1980

[30] Foreign Application Priority Data

Oct. 12, 1979 [JP] Japan ................................ 54-130801

[51] Int. Cl.³ ............................................... H04N 7/18
[52] U.S. Cl. .......................... 358/105; 340/146.3 MA;
358/138; 358/160; 364/515
[58] Field of Search ........................ 358/105, 138, 160;
340/146.3 MA; 364/515, 516, 517

[56] References Cited

U.S. PATENT DOCUMENTS 3,936,800 2/1976 Ejiri ........................... 340/146.3 MA
4,254,400 3/1981 Yoda ......................... 340/146.3 MA

*Primary Examiner*—Howard Britton
*Attorney, Agent, or Firm*—Craig & Antonelli

[57] ABSTRACT

A visual information processing apparatus which processes image data produced by a TV camera to detect the change in image with the lapse of time. The visual information processing apparatus comprises a circuit which generates the data of coordinates X and Y that represent a scanning position on the image, a memory for storing a plurality of microprograms, a control circuit which addresses an initial instruction of a microprogram corresponding to the coordinate Y when the coordinate X reached a particular value that is specified by an external unit, and a unit for processing the image data from said TV camera in accordance with a microprogram that is read out from said memory, wherein the same microprograms are periodically read out by bringing least significant several bits among the binary data which represents the coordinate Y to correspond to an initial address of each of the microprograms. With this visual information processing apparatus, the TV screen is divided into a plurality of blocks and a reduced number of microprograms are required for processing the image data.

6 Claims, 11 Drawing Figures

VISUAL INFORMATION PROCESSING APPARATUS

BACKGROUND OF THE INVENTION

The present invention relates to a visual information processing apparatus, and more specifically to an apparatus which processes visual information to detect the change in image with the lapse of time and to recognize objects in the image.

Apparatus which picks up a particular visual field by a TV camera and which automatically discriminates whether any change has developed in the image or in which region in the visual field the change in image has developed, can be usefully employed for an automatic detector which detects the number of customers, for example, in an elevator hall or for a group control system of elevators using the detector.

The most fundamental system for detecting the change in image consists of comparing the image data which corresponds to the background image that has been stored beforehand with the image data that is produced in a raster-scanning manner from a video device, to detect the difference.

However, the amount of digitized data covering the whole image as picked up by the TV camera is so great that comparison of the two images by directly storing them requires large apparatus for storing the image data, and further requires extremely high speed of data processing operation to deal with the data, resulting in expensive and bulky apparatus.

Furthermore, even when the same subject is being picked up, the image data obtained through the TV camera easily undergoes variation depending upon the intensity of light which illuminates the subject or depending upon the direction from which the subject is illuminated. Accordingly, when the two pictures are directly compared relying upon the individual image data, the data processing apparatus often erroneously renders the decision even when the same subject is being picked up.

To cope with the above-mentioned problem, the applicant of the present invention has previously proposed a visual information processing apparatus in which the whole image screen was divided into a plurality of blocks $E_{00}$ to $E_{mn}$, and the image corresponding to the background that had been stored beforehand was compared with the input image for each of the blocks, as has been disclosed in U.S. Pat. No. 3,936,800, Japanese Patent Application No. 139667/73 (Japanese Patent Laid-Open No. 93059/75), and Japanese Patent Application No. 153142/78 which corresponds to U.S. Pat. No. 4,254,400.

In this case, the individual blocks consist of a plurality of picture elements, picture element information is processed for each of the blocks along with the raster scanning, and the data are calculated having therein features which are in line with the direction of total brightness of the blocks or in line with the degree of brightness of the blocks to compress the amount of data that is to be compared with the background. With regard to the image that represents the background, the features are coded for each of the blocks in the same manner as mentioned above, and the data is stored in the memory device.

According to the system of the above-mentioned prior applications, blocks to be processed are specified for every video frame, and input image is compared with the background image by utilizing a vacant time during the raster scanning. Therefore, it is allowed, for every several frames in which the whole data processing is finished, to know the total number of blocks in which change has taken place or to know the distribution of changes in the video field, thereby to automatically detect, for example, the number of customers relying upon the above information.

The visual information processing apparatus based upon the abovementioned system can be extensively applied to a variety of industrial fields such as counting of articles in the steps of production, monitoring of residual amount, counting of blood cells from the microimage, detection of intruders in the safeguard system, and the like. The visual information processing apparatus can also be applied not only to live video signals produced by the TV cameras, but also to video signals that are read out from a memory in a manner of raster scanning.

SUMMARY OF THE INVENTION

The object of the present invention is to provide a visual information processing apparatus of the system which divides the whole image screen into a plurality of blocks to process the image for each of the blocks, the visual information processing apparatus being constructed in a reduced size.

Another object of the present invention is to provide a visual information processing apparatus which enables the number of blocks to be relatively easily changed and further enables the mode of compressing the data to be easily changed.

To achieve the above-mentioned objects according to the present invention, the visual information processing apparatus comprises first means for successively producing digitized image data in a raster-scanning manner, second means for producing coordinates (X, Y) of the two-dimensional image, third means which has a plurality of microprograms and which executes microprograms that correspond to values of the Y coordinate thereby to process image data produced from the first means, and fourth means which drives the third means when a value of the X coordinate is in agreement with a particular value $X_l$, wherein the image data is processed for every predetermined region.

If more concretely illustrated, the above-mentioned third means comprises of memory means for storing a plurality of microprograms, sequencer means for successively reading, from the above memory means, micro-instructions that constitute microprogram corresponding to the Y coordinate, and arithmetic means which is controlled by the micro-instructions that are read out to process the image data that contains outputs produced from the first means.

The fourth means comprises means which produces a starting signal when the X coordinate is in agreement with a particular value $X_l$, and fifth means which sets the particular value $X_l$ to the above means at a predetermined timing and which controls the starting signal that is fed to the third means.

The foregoing and other objects, advantages, manner of operation and novel features of the present invention will be understood from the following detailed description when read in connection with the accompanying drawings.

DESCRIPTION OF THE PREFERRED EMBODIMENT

Figure 1:
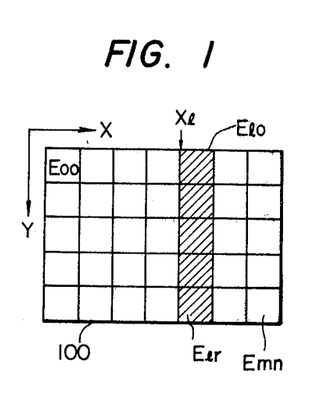
FIGS. 1 and 2 are diagrams for illustrating the principle of the visual information processing apparatus according to the present invention.

According to the present invention as shown in FIG. 1, the image screen 100 is divided into m units in the direction X and n units in the direction Y, i.e., divided into a total of m×n blocks $E_{00}$ to $E_{mn}$, and the image that corresponds to the background which has been stored beforehand in the memory means is compared with an input image for each of the blocks E.

Figure 2:
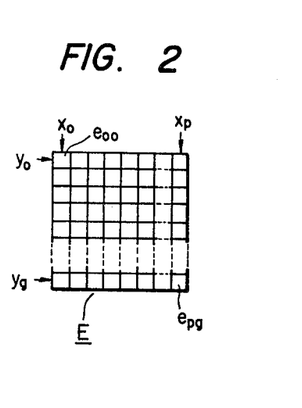

Referring to FIG. 2, each of the blocks $E_{00}$ to $E_{mn}$ consists of a plurality of picture elements $e_{00}$ to $e_{pq}$. Information of the individual picture elements is raster-scanned, and is successively fed from a video input device to a data processing apparatus.

Blocks of a number of n are processed by the information processing apparatus during a one frame of scanning as indicated by hatched area which vertically runs in the form of a belt in FIG. 1. The information processing apparatus stores the picture element information which is introduced during a period in which a scanning point on the picture stays on the belt-like region, and processes the thus stored picture element information before the scanning point which has moved out of the belt-like region enters again into the belt-like region. Thus, the information processing apparatus processes image data for n blocks in a compressed manner during the scanning of one frame. The position of the belt-like region is shifted for each frame. Namely, the processing of data is completed for all of the blocks on the image screen through m times of frame scanning. Depending upon the ability of the information processing apparatus, two or more belt-like regions can be processed during the scanning of one frame.

Figure 3:
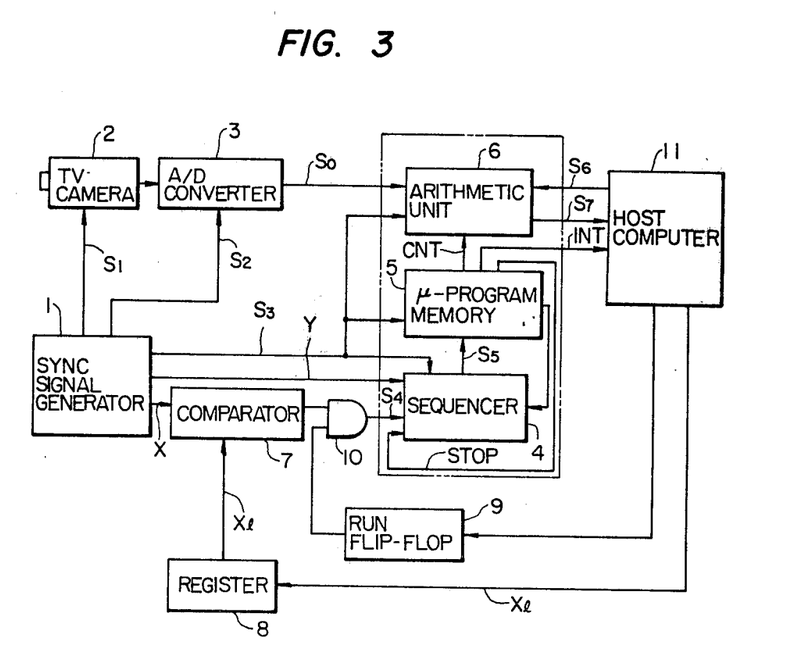
FIG. 3 is a diagram illustrating a whole setup of the apparatus according to the embodiment of the present invention.

FIG. 3 shows a whole setup of the visual information processing apparatus according to the present invention, in which reference numeral 1 denotes a synchronous signal generator 2, denotes a TV camera, 3 denotes an A/D converter which converts an image signal produced by the TV camera into a digital signal consisting, for example, of four bits depending upon the brightness, 4 denotes a sequencer for successively generating addresses of a microprogram, 5 denotes a memory for storing microprogram, 6 denotes an arithmetic unit which is controlled by a microprogram read from the memory 5 and which processes a digital signal $S_0$ produced by the A/D converter 3, reference numerals 7, 8, 9 and 10 denote a comparator, a register, a RUN flip-flop and an AND gate that constitute a circuit for starting and stopping the image signal processing unit which consists of the sequencer 4, the memory 5 and the arithmetic unit 6, and reference numeral 11 denotes a host computer which controls the abovementioned start/stop circuit and which processes the processed result that is obtained by processing the image signals.

The synchronous signal generator 1 produces a synchronous scanning signal $S_1$ that is fed to the TV camera 2, a synchronous signal $S_2$ that is fed to the A/D converter, signals X and Y which indicate a position of image signal on the screen, which is produced by the TV camera, and a clock signal $S_3$ for processing the image signals.

Here it is assumed that a laterally scanning coordinate X generated by the synchronous signal generator 1 is in agreement with a value $X_l$ which is given by the register 8. In this case, if the RUN flip-flop 9 is "1", the comparator circuit 7 feeds a pulse $S_4$ to the sequencer 4 via the AND gate 10 so that the sequencer 4 starts to operate. The sequencer 4 has been served with a vertically scanning coordinate Y of TV camera that is produced by the synchronous signal generator 1, and produces a signal $S_5$ which addresses any one of the microprograms in the memory 5 responsive to a value Y at the time when the sequencer 4 is started.

The microprogram consists of a series of microinstructions that generate signals for controlling a whole circuit system, such as a stop control signal STOP for the sequencer 4, an arithmetic control signal CNT for the arithmetic unit 6, and an interrupt signal INT for the host computer 11. These micro-instructions are successively read out from the memory 5 responsive to the clock signals $S_3$.

Below is illustrated the operation when the apparatus of FIG. 3 is applied to an apparatus for detecting the number of customers. In the apparatus for detecting the number of customers, the image screen of the TV camera is divided into the form of a grid as shown in FIG. 1, and the same processing is effected, i.e., data is processed in a compressed manner for all of the blocks in the grid, and the compressed data is compared with the past data which has been stored through similar processing.

Referring to FIG. 3, a coordinate $X_l$ for starting the lateral processing is set to the register 8 by the host computer 11, and the RUN flip-flop 9 is set to "1". Therefore, as soon as the laterally scanning coordinate of the TV camera 2 has arrived at $X_l$, a train of micro-instructions of a microprogram corresponding to the coordinate Y is successively read out from the memory 5, and the corresponding arithmetic operation is executed by the arithmetic unit 6. In the coordinate Y (corresponding to $y_0$ in FIG. 2) which corresponds to the first line in the block, a digital signal $S_0$ from the A/D converter 3 corresponding to an image signal during the scanning, is fed to the memory in the arithmetic unit 6, and registers and work areas allotted to the memory in the arithmetic unit are cleared. In the coordinate Y in the second and subsequent lines, the digital signals $S_0$ are fed while the block is being scanned, to compress image data. In the coordinate Y ($y_q$ in FIG. 2) which corresponds to the last line in the block, all of the compressed data in the block is further compressed to finally interrupt the host computer 11. Upon receipt of an interrupt signal INT, the host computer 11 introduces compressed data from the arithmetic unit 6, and compares the data of the block with the background data until the interrupt of next block is developed, and performs arithmetic operations of higher orders such as calculations of the number of customers.

According to this processing system, the sequencer 4 must start the operation for processing data after the coordinate X has come into agreement with $X_l$, and must finish a series of data processing operations stated by a microprogram before the coordinate comes into agreement with $X_l$ in the next line while the coordinate X passes through the block. Usually, however, image data of a quantity of one line in one block can be sufficiently processed within this period. By so doing, image blocks $E_{l0}$ to $E_{ln}$ of one column at the position of $X_l$ can be processed for each scanning of one screen by the TV camera. Therefore, if $X_l$ is suitably changed for each field by the host computer 11, it is possible to detect the number of customers over the whole screen depending upon whether the past data of the whole blocks stored in the host computer 11 is in agreement or not with the newly fed data of the whole blocks.

In addition to dealing with image data of two lines fed to the memory, the image data can be compressed by the arithmetic unit 6 by successively comparing the quantity of data among a plurality of sets of picture elements that have particular relations in two-dimensional positions to count the number of appearance for each direction of brightness and darkness as proposed, for example, in U.S. Pat. No. 4,254,400 that was filed by the applicant of the present invention, or by subjecting the counted values to the Fourier transform at the last line of each block. Further, each block is periodically generated relative to the coordinate Y. For example, if the period is set to be 16 lines, i.e., q=15 in FIG. 2, the sequencer 4 may generate a microprogram address relative to a numerical value consisting of least significant four bits in the input coordinate Y which is given by binary notation.

The sequencer 4 and the arithmetic unit 6 will now be illustrated below in further detail.

Figure 4:
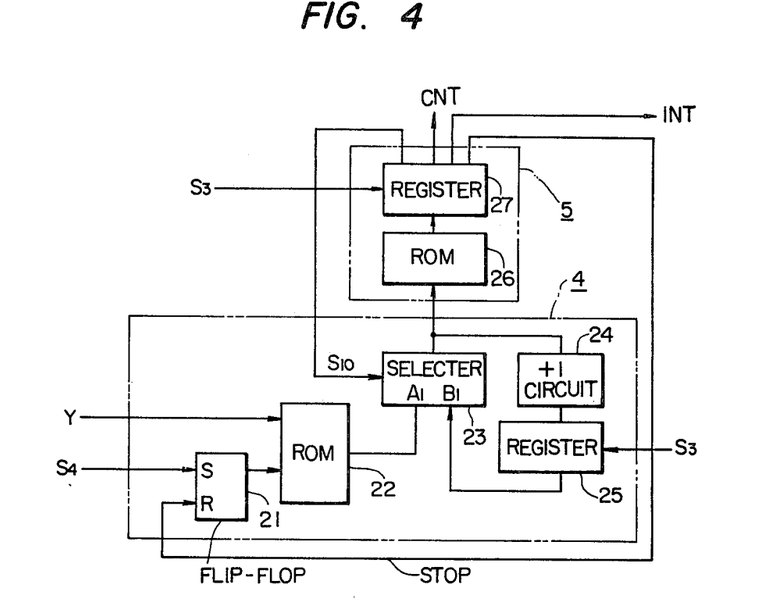
FIG. 4 is a diagram which concretely illustrates blocks 4 and 5 of FIG. 3.

FIG. 4 is a diagram illustrating a concrete circuit setup of the sequencer 4 and the microprogram memory 5, in which reference numeral 21 denotes a flip-flop which will be set by a signal $S_4$, and 22 denotes a read-only memory (ROM) which produces a predetermined microprogram address responsive to a signal Y when the flip-flop 21 is being set. Reference numeral 23 denotes a selection circuit which selects either one of the output which is produced by the memory 22 and is fed to a terminal $A_1$ or the output which is produced by a register 25 and is fed to a terminal $B_1$ responsive to a selection signal $S_{10}$, 26 denotes a read-only memory (ROM) for storing micro-instructions which introduces the output of the selection circuit 23 as an address and which produces micro-instructions that constitute a microprogram which is a content, 27 denotes a register which temporarily stores the micro-instruction read from the memory 26 for a period of one clock, and which produces a control signal CNT, INT, $S_{10}$ or STOP responsive to the micro-instruction, 24 denotes a plus-one circuit which adds 1 to the output data of the selection circuit 23, and 25 denotes a register for temporarily storing the output of the circuit 24 for a period of one clock.

While the flip-flop 21 is in a reset state, the selection circuit 23 selects a particular address signal which is fed to the terminal $A_1$ from the memory 22. Due to the address signal, in this case, a micro-instruction of non-operation is read from the memory 26 so that a signal $S_{10}$ is generated to select the terminal $A_1$ of the selection circuit 23. Therefore, during the above-mentioned period in which the flip-flop 21 is reset, only the non-operation control signal CNT is produced to the external units no matter how many times the clock signal $S_3$ is introduced, and the arithmetic unit 6 remains in a stop condition.

When the START signal $S_4$ is introduced from the AND gate 10, the flip-flop 21 assumes the state "1", and the memory 22 produces an initial address of a microprogram which is determined by the coordinate Y.

The micro-instructions which form a microprogram in the memory 26 generate a signal $S_{10}$ which causes the selection circuit 23 to select the terminal $B_1$. Therefore, the micro-instruction which is to be read in the next time is the one that is stored in the above-mentioned initial address +1. Thus, once an initial address of a microprogram is specified, the +1 address is successively selected in synchronism with the clock signal $S_3$, and the microinstructions in the microprogram are successively read into the register 27.

The last instruction in each of the microprograms produces a signal $S_{10}$ which causes the selection circuit 23 to select the terminal $A_1$ and a STOP signal which resets the flip-flop 21 to "0". Therefore, after the last instruction is executed, the sequencer 4 is stopped again.

With the microprogram being constructed in this way, the microprogram can be executed responsive to the coordinate Y for each production of the START signal $S_4$, and the control signal specified by the micro-instruction can be successively produced. Further, by generating an interrupt signal INT at the final micro-instruction of the microprogram which is read by the final scanning line of each block, the finish of the image data processing of each block can be informed to the host computer 11.

Figure 5:
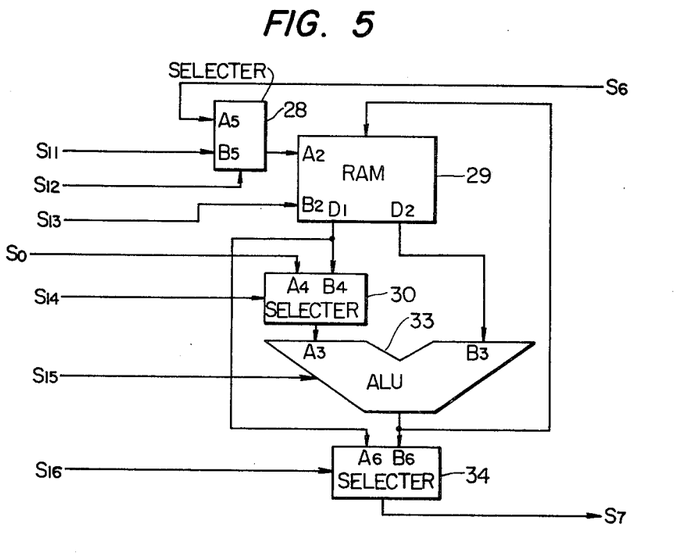
FIG. 5 is a diagram which concretely illustrates a block 6 of FIG. 3.

FIG. 5 illustrates in further detail the circuit setup of the arithmetic unit 6, in which reference numerals 28 and 30 denote selection circuits that will be switched by control signals $S_{12}$ and $S_{14}$, 29 denotes a 2-port random access memory (RAM) which produces through output terminals $D_1$ and $D_2$ the contents corresponding to address signals fed to terminals $A_2$ and $B_2$, and 33 denotes a general-purpose arithmetic unit (ALU) which is controlled by a control signal $S_{15}$. The general-purpose arithmetic unit ALU effects the addition, subtraction, comparison and shift operation of the two signals that are fed to the terminals $A_3$ and $B_3$ depending upon the state of the control signal $S_{15}$. The output of the ALU 33 is written on the address of the terminal $B_2$ of the memory 29. The signal $S_0$ is a digitized image signal that is produced by the A/D converter 3 of FIG. 3, and the signals $S_{11}$ to $S_{16}$ are embedded in the micro-instructions to constitute a control signal CNT that is produced by the register 27 of FIG. 4. Therefore, if the train of these control signals is stored beforehand in the microprogram as a train of microinstructions, any operation for processing image data can be executed by the arithmetic unit 6.

For example, the video signal $S_0$ fed to the terminal $A_4$ is selected by the selection circuit 30 responsive to the control signal $S_{14}$, and the input introduced to the terminal $A_3$ is directly produced by the ALU 33 responsive to the control signal $S_{15}$. This enables the video signal $S_0$ fed from the A/D converter circuit 3 to be stored in the address that is specified by the input address $S_{13}$ which is fed to the terminal $B_2$ of the 2-port RAM 29. It is further obvious that any arithmetic operation can be effected for the content of the 2-port RAM 29.

If the thus operated result is stored in the 2-port RAM 29, an address signal $S_6$ is given by the host computer 11, and the output of the 2-port RAM 29 at that time is fed as a signal $S_7$ to the host computer via the selection circuit 34. In this case, when the arithmetic operation is finished, the sequencer 4 is in the stopped condition and the non-operation micro-instruction is produced from the microprogram memory, the signals $S_{12}$ and $S_{16}$ should select the input of the terminal $A_5$ of the selection circuit 28 and the input of the terminal $A_6$ of the selection circuit 34.

Below is illustrated a concrete setup of the microprogram which is adapted for the visual information processing apparatus of the present invention. In this example, an image block E illustrated in FIG. 2 consists of 8 lateral picture elements and 16 vertical picture elements (i.e., p=0 to 7 and q=0 to 15), i.e., consists of a total of 128 picture elements.

Figure 6:
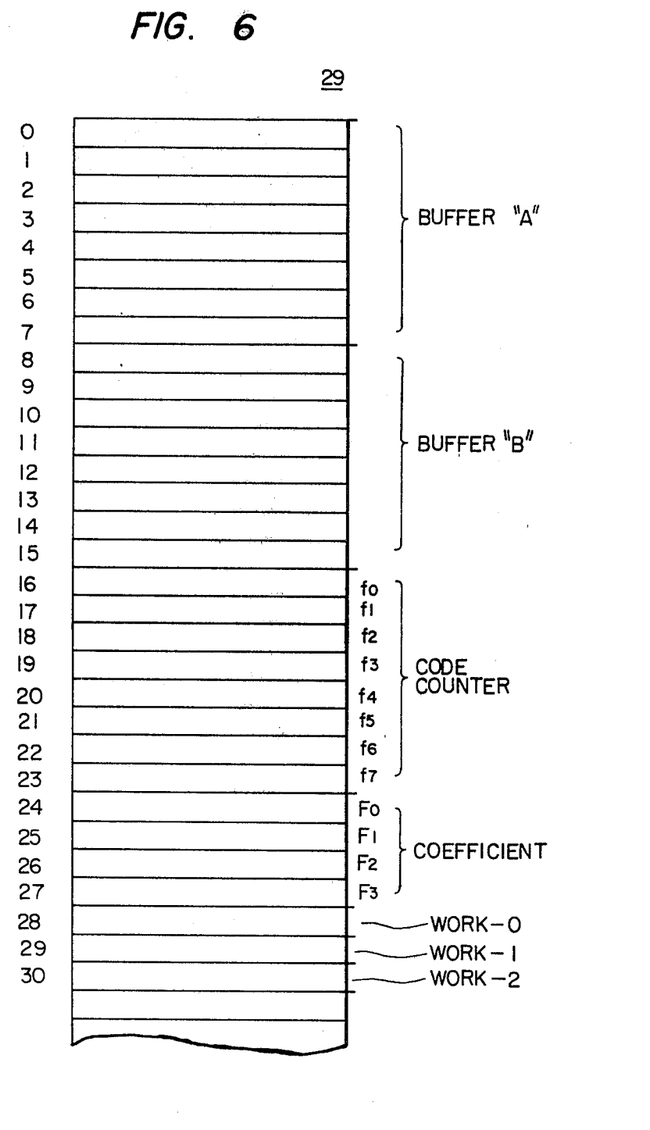
FIG. 6 is a diagram illustrating an example of the data area which is allotted to a memory 29 of FIG. 5.

Referring to 2-port RAM 29 shown in FIG. 6, address 0 to address 7 constitute a data buffer area "A", address 8 to address 15 constitute a data buffer area "B", address 16 to address 23 constitute code counter areas $f_0$ and to $f_7$, address 24 to address 27 constitute Fourier coefficient areas $F_0$ to $F_3$, and addresses 28, 29 and 30 constitute working areas WORK-0, WORK-1 and WORK-2, respectively.

Figure 7:
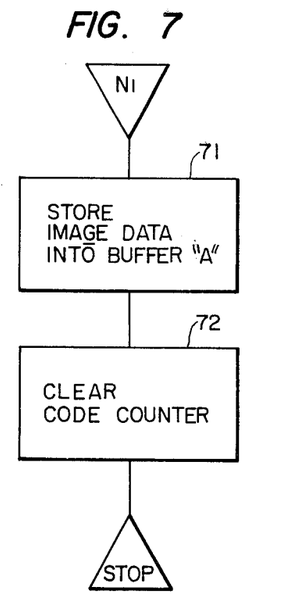
FIGS. 7 to 9 are flow charts of microprograms that can be applied to the apparatus of the present invention.

FIG. 7 illustrates a flow chart of a first microprogram that will be executed when a value of coordinate Y corresponds to a first line of the image block E. This microprogram starts from an address $N_1$ of the ROM 26 and consists of a routine 71 which successively stores the input image data $e_{00}$ to $e_{70}$ into the buffer area "A", and a routine 72 which clears addresses 16 to 27 that are code counter areas in the 2-port RAM 29.

Figure 8:
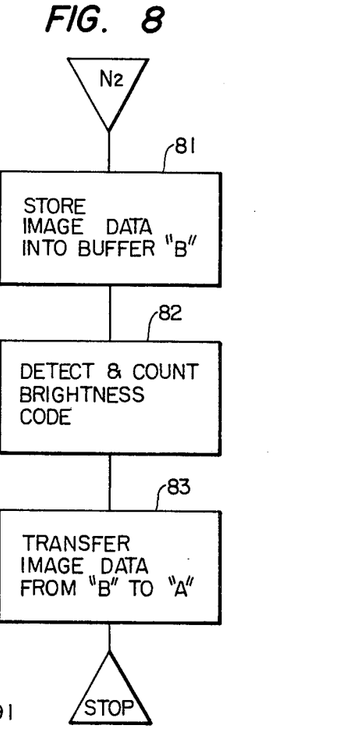

FIG. 8 illustrates a flow chart of a second microprogram which will be executed when a value of coordinate Y corresponds to second to fifteenth lines of the image block E. This microprogram starts from an address $N_2$ in the ROM 26 and consists of a routine 81 which successively stores the input image data, for example, $e_{01}$ to $e_{71}$ in the buffer area "B", a routine 82 which processes these data and the image data which has been stored in the buffer area "A" to determine the direction of brightness, and a routine 83 which transfers the data in the buffer area "B" to the buffer area "A".

Figure 10:
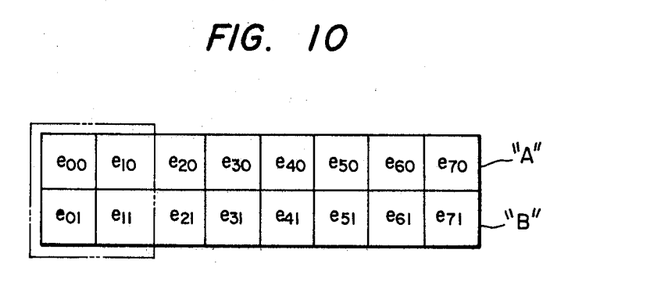
FIGS. 10 and 11 are diagrams illustrating a method of compressing the image data.
Figure 11:
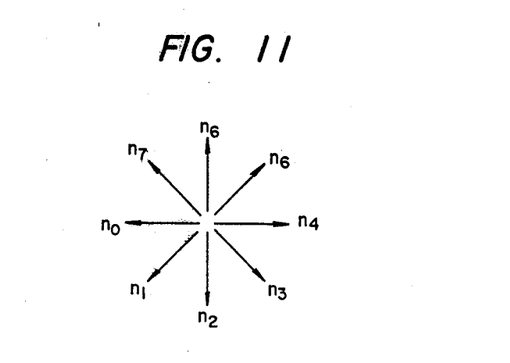

Here, the routine 82 is illustrated in further detail. When the routine 81 is finished, the buffer areas "A" and "B" store the data of picture elements of two scanning lines which are neighboring in the image plane E as shown in FIG. 10. Therefore, by giving attention to the four neighboring picture elements, for example, by giving attention to a region consisting of $e_{00}$, $e_{10}$, $e_{01}$ and $e_{11}$ surrounded by a dotted line, if the intensity is examined with respect to ($e_{00}>e_{10}$), ($e_{01}>e_{10}$), ($e_{01}>e_{00}$), ($e_{11}>e_{00}$), $e_{10}>e_{00}$), ($e_{10}>e_{01}$), ($e_{00}>e_{01}$) and ($e_{00}>e_{11}$), it is possible to know which one of the brightness directions $n_0$ to $n_7$ shown in FIG. 11 is included in this region. The code counters $f_0$ to $f_7$ allotted to the 2-port RAM 29 are corresponding to the above-mentioned brightness directions $n_0$ to $n_7$, and the routine 82 shifts the discrimination region consisting of four picture elements one picture element by one element to discriminate the relation of intensity for each of the sets [$e_{00}$, $e_{10}$, $e_{01}$, $e_{11}$], [$e_{10}$, $e_{20}$, $e_{11}$, $e_{21}$], - - - [$e_{60}$, $e_{70}$, $e_{61}$, $e_{71}$], so that the number of detection is counted by the code counters $f_0$ to $f_7$ for each of the brightness directions.

When the second program is repetitively executed up to fifteenth line in the image block E, the code counters obtain information in which the features of image in the block E is compressed to 8 bytes.

Figure 9:
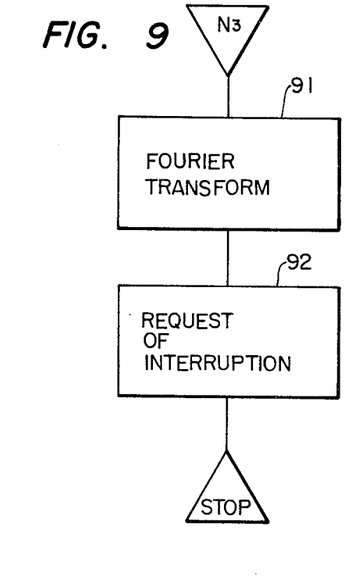

FIG. 9 illustrates a flow chart of a third program which will be executed when a value in the coordinate Y corresponds to the last line in the block E. This program starts from an address $N_3$ of the ROM 26, and consists of a routine 91 which performs Fourier transform to further compress the data of the code counters $f_0$ to $f_7$, and a routine 92 which requests interrupt to the host computer.

The Fourier transform is executed, for example, by the following operation, and the Fourier cofficients $F_0$, $F_1$, $F_2$ and $F_3$ which are found are stored in the areas $F_0$ to $F_3$ of the 2-port RAM 29.

$$F_0 = 2*f_1 + 3*f_2 + 2*f_3 - 2*f_5 - 3*f_6 - 2*f_7 \qquad (1)$$

$$F_1 = 3*f_0 + 2*f_1 - 2*f_3 - 3*f_4 - 2*f_5 + 2*f_7 \qquad (2)$$

$$F_2 = 3*f_1 - 3*f_3 + 3*f_5 - 3*f_7 \qquad (3)$$

$$F_3 = 3*f_0 - 3*f_2 + 3*f_4 - 3*f_6 \qquad (4)$$

Examples of the above-mentioned first, second and third microprograms are illustrated below. Among the microinstructions, portions which produce the control signal $S_{15}$ are expressed by mnemonic names, and the corresponding relations among the functions and control signals $S_{12}$, INT, STOP and JUMP which are produced simultaneously, are shown in Table 1, to simplify the explanation. The selection circuits 23, 28 so operate that the inputs of terminals $A_1$, $A_5$ are selected when the control signals $S_{10}$, $S_{12}$ are "1", and the inputs of terminals $B_1$, $B_5$ are selected when the control signals $S_{10}$, $S_{12}$ are "0".

TABLE - 1

| Name | Function ($S_{15}$) | $S_{12}$ $S_{16}$ | INT | STOP | JUMP |
|---|---|---|---|---|---|
| TRF | $(A_3) \rightarrow B_2$ | 0 | 0 | 0 | NOOP |
| A | $(B_3)+(A_3) \rightarrow B_2$ | 0 | 0 | 0 | NOOP |
| S | $(B_3)-(A_3) \rightarrow B_2$ | 0 | 0 | 0 | NOOP |
| SL 1 | $2*(A_3) \rightarrow B_2$ | 0 | 0 | 0 | NOOP |
| CMP | IF $(B_3)>(A_3)$ "1"$\rightarrow B_2$ else "0"$\rightarrow B_2$ | 0 | 0 | 0 | NOOP |
| CL | "0"$\rightarrow B_2$ | 0 | 0 | 0 | NOOP |
| STOP | NOOP | 1 | 0 | 1 | JUMP TO WAIT |
| INT & STOP | NOOP | 1 | 1 | 1 | JUMP TO WAIT |
| WAIT | NOOP | 1 | 0 | 0 | |

| First program for q = 0 | | | | |
|---|---|---|---|---|
| Routine Number | $S_{15}$ | $S_{14}$ | $S_{13}$ ($B_2$) | $S_{11}$ ($A_2$) | $S_{10}$ |
| 1 | TRF | 1 | 01000 | | 0 |
| | TRF | 1 | 01001 | | 0 |
| | TRF | 1 | 01010 | | 0 |
| | TRF | 1 | 01011 | | 0 |
| | TRF | 1 | 01100 | | 0 |
| | TRF | 1 | 01101 | | 0 |
| | TRF | 1 | 01110 | | 0 |
| | TRF | 1 | 01111 | | 0 |
| 2 | CL | | 10000 | | 0 |
| | CL | | 10001 | | 0 |
| | CL | | 10010 | | 0 |
| | CL | | 10011 | | 0 |
| | CL | | 10100 | | 0 |
| | CL | | 10101 | | 0 |
| | CL | | 10110 | | 0 |
| | CL | | 10111 | | 0 |
| 3 | STOP | | | | 1 |

TABLE - 1-continued

Second program for q = 1 to 14

| Routine Number | | $S_{15}$ | $S_{14}$ | $S_{13}(B_2)$ | $S_{11}(A_2)$ | $S_{10}$ |
|---|---|---|---|---|---|---|
| 4 | TRF | 1 | 00000 | | 0 |
| | TRF | 1 | 00001 | | 0 |
| | TRF | 1 | 00010 | | 0 |
| | TRF | 1 | 00011 | | 0 |
| | TRF | 1 | 00100 | | 0 |
| | TRF | 1 | 00101 | | 0 |
| | TRF | 1 | 00110 | | 0 |
| | TRF | 1 | 00111 | | 0 |
| 5 | TRF | 0 | 11100 | 00000 | 0 |
| | CMP | 0 | 11100 | 00001 | 0 |
| | A | 0 | 11100 | 10000 | 0 |
| | TRF | 0 | 10000 | 11100 | 0 |
| 6 | TRF | 0 | 11100 | 00001 | 0 |
| | CMP | 0 | 11100 | 00000 | 0 |
| | A | 0 | 11100 | 10100 | 0 |
| | TRF | 0 | 10100 | 11100 | 0 |
| 7 | TRF | 0 | 11100 | 01000 | 0 |
| | CMP | 0 | 11100 | 00001 | 0 |
| | A | 0 | 11100 | 10001 | 0 |
| | TRF | 0 | 10001 | 11100 | 0 |
| 8 | TRF | 0 | 11100 | 00001 | 0 |
| | CMP | 0 | 11100 | 01000 | 0 |
| | A | 0 | 11100 | 10101 | 0 |
| | TRF | 0 | 10101 | 11100 | 0 |
| 9 | TRF | 0 | 11100 | 01000 | 0 |
| | CMP | 0 | 11100 | 00000 | 0 |
| | A | 0 | 11100 | 10010 | 0 |
| | TRF | 0 | 10010 | 11100 | 0 |
| 10 | TRF | 0 | 11100 | 00000 | 0 |
| | CMP | 0 | 11100 | 01000 | 0 |
| | A | 0 | 11100 | 10110 | 0 |
| | TRF | 0 | 10110 | 11100 | 0 |
| 11 | TRF | 0 | 11100 | 01001 | 0 |
| | CMP | 0 | 11100 | 00000 | 0 |
| | A | 0 | 11100 | 10011 | 0 |
| | TRF | 0 | 10011 | 11100 | 0 |
| 12 | TRF | 0 | 11100 | 00000 | 0 |
| | CMP | 0 | 11100 | 01001 | 0 |
| | A | 0 | 11100 | 10111 | 0 |
| | TRF | 0 | 10111 | 11100 | 0 |
| . | . | . | . | . | . |
| . | . | . | . | . | . |
| . | . | . | . | . | . |
| 53 | TRF | 0 | 11100 | 00110 | 0 |
| | CMP | 0 | 11100 | 00111 | 0 |
| | A | 0 | 11100 | 10000 | 0 |
| | TRF | 0 | 10000 | 11100 | 0 |
| 54 | TRF | 0 | 11100 | 00111 | 0 |
| | CMP | 0 | 11100 | 00110 | 0 |
| | A | 0 | 11100 | 10100 | 0 |
| | TRF | 0 | 10100 | 11100 | 0 |
| 55 | TRF | 0 | 11100 | 01110 | 0 |
| | CMP | 0 | 11100 | 00111 | 0 |
| | A | 0 | 11100 | 10001 | 0 |
| | TRF | 0 | 10001 | 11100 | 0 |
| 56 | TRF | 0 | 11100 | 00111 | 0 |
| | CMP | 0 | 11100 | 01110 | 0 |
| | A | 0 | 11100 | 10101 | 0 |
| | TRF | 0 | 10101 | 11100 | 0 |
| 57 | TRF | 0 | 11100 | 01110 | 0 |
| | CMP | 0 | 11100 | 00110 | 0 |
| | A | 0 | 11100 | 10010 | 0 |
| | TRF | 0 | 10010 | 11100 | 0 |
| 58 | TRF | 0 | 11100 | 00110 | 0 |
| | CMP | 0 | 11100 | 01110 | 0 |
| | A | 0 | 11100 | 10110 | 0 |
| | TRF | 0 | 10110 | 11100 | 0 |
| 59 | TRF | 0 | 11100 | 01111 | 0 |
| | CMP | 0 | 11100 | 00110 | 0 |
| | A | 0 | 11100 | 10011 | 0 |
| | TRF | 0 | 10011 | 11100 | 0 |
| 60 | TRF | 0 | 11100 | 00110 | 0 |
| | CMP | 0 | 11100 | 01111 | 0 |
| | A | 0 | 11100 | 10111 | 0 |
| | TRF | 0 | 10111 | 11100 | 0 |
| 61 | TRF | 0 | 01000 | 00000 | 0 |
| | TRF | 0 | 01001 | 00001 | 0 |
| | TRF | 0 | 01010 | 00010 | 0 |
| | TRF | 0 | 01011 | 00011 | 0 |
| | TRF | 0 | 01100 | 00100 | 0 |
| | TRF | 0 | 01101 | 00101 | 0 |
| | TRF | 0 | 01110 | 00110 | 0 |
| | TRF | 0 | 01111 | 00111 | 0 |
| 62 | STOP | | | | 1 |

Third program for q = 15

| Routine Number | | $S_{15}$ | $S_{14}$ | $S_{13}(B_2)$ | $S_{11}(A_2)$ | $S_{10}$ |
|---|---|---|---|---|---|---|
| 63 | TRF | 0 | 11100 | 10001 | 0 |
| | A | 0 | 11100 | 10011 | 0 |
| | S | 0 | 11100 | 10100 | 0 |
| | S | 0 | 11100 | 10111 | 0 |
| | SL 1 | 0 | 11100 | 11100 | 0 |
| | TRF | 0 | 11101 | 11100 | 0 |
| | TRF | 0 | 11100 | 10010 | 0 |
| | S | 0 | 11100 | 10110 | 0 |
| | TRF | 0 | 11110 | 11100 | 0 |
| | SL 1 | 0 | 11100 | 11100 | 0 |
| | A | 0 | 11100 | 11110 | 0 |
| | A | 0 | 11100 | 11101 | 0 |
| | TRF | 0 | 11000 | 11100 | 0 |
| 64 | TRF | 0 | 11100 | 10001 | 0 |
| | S | 0 | 11100 | 10011 | 0 |
| | S | 0 | 11100 | 10101 | 0 |
| | A | 0 | 11100 | 10111 | 0 |
| | SL 1 | 0 | 11100 | 11100 | 0 |
| | TRF | 0 | 11101 | 11100 | 0 |
| | TRF | 0 | 11100 | 10000 | 0 |
| | S | 0 | 11100 | 10100 | 0 |
| | TRF | 0 | 11110 | 11100 | 0 |
| | SL 1 | 0 | 11100 | 11100 | 0 |
| | A | 0 | 11100 | 11110 | 0 |
| | A | 0 | 11100 | 11101 | 0 |
| | TRF | 0 | 11001 | 11100 | 0 |
| 65 | TRF | 0 | 11100 | 10001 | 0 |
| | S | 0 | 11100 | 10011 | 0 |
| | A | 0 | 11100 | 10101 | 0 |
| | S | 0 | 11100 | 10111 | 0 |
| | TRF | 0 | 11101 | 11100 | 0 |
| | SL 1 | 0 | 11100 | 11100 | 0 |
| | A | 0 | 11100 | 11101 | 0 |
| | TRF | 0 | 11010 | 11100 | 0 |
| 66 | TRF | 0 | 11100 | 10000 | 0 |
| | S | 0 | 11100 | 10010 | 0 |
| | A | 0 | 11100 | 10100 | 0 |
| | S | 0 | 11100 | 10110 | 0 |
| | TRF | 0 | 11101 | 11100 | 0 |
| | SL 1 | 0 | 11100 | 11100 | 0 |
| | A | 0 | 11100 | 11101 | 0 |
| | TRF | 0 | 11011 | 11100 | 0 |
| 67 | INT & STOP | | | | 1 |
| 68 | WAIT | | | | 1 |

In the first program, the portions indicated by routine numbers 1 and 2 corresponds to routines 71 and 72 in the flow chart of FIG. 7, respectively.

In the second program, the portion indicated by routine number 4 corresponds to the routine 81 of FIG. 8. The portions indicated by routine numbers 5 to 12 discriminate the brightness directions $n_0$ to $n_7$ for an initial set of four picture elements and count up the code counters $f_0$ to $f_7$. Routine numbers 53 to 60 perform the same arithmetic operation as above for the last set of four picture elements. Portions (routine numbers 13 to 52) which perform the same processing as above for the second set of four picture elements through up to the sixth set of picture elements, are not mentioned here. The portions of routine numbers 5 to 60 corresponds to the routine 82 of FIG. 8, and the portion indicated by routine number 61 corresponds to the routine 83.

In the third program, routine numbers 63 to 66 calculate Fourier series $F_0$ to $F_3$, and corresponds to routine 91 of FIG. 9, and routine number 67 corresponds to the routine 92.

As will be obvious from the above-mentioned embodiment, the visual information processing apparatus of the present invention presents the following advantages:

(1) The control circuit for processing the image screen which is divided into small blocks, can be operated by microprograms, enabling the apparatus to be constructed in a reduced size.

(2) Since the image is processed relying upon microprograms, the apparatus can be constructed in a reduced size. Further, by changing the microprograms, a variety of complex contents can be processed through the same hardware.

(3) The arithmetic unit 6 which directly deals with the image data, and the host computer 11 which performs the comparison, recognition and control utilizing the processed result, share and execute the processing in parallel within the same period of time, so that the image data are processed at a high speed.

Owing to the above-mentioned merits, it is possible to process image data economically, at high speeds, and practically.

With the visual information processing apparatus of the present invention, furthermore, the function of the host computer 11 can be substituted by the arithmetic unit 6 depending upon the microprograms. In this case, it is possible to realize a simply constructed visual information processing system without including the host computer 11, although the processing speed is decreased.

According to the embodiment of the present invention, although the image data of one block was processed during each period of horizontal scanning, it is possible to process the image data of two or more blocks during each period of horizontal scanning provided the arithmetic unit 6 has a sufficiently high data processing speed, in order to reduce the number of image frames required for processing the data of whole picture.

Further, although the first microprogram of the embodiment of the present invention did not compress the image data, it is also allowable to so construct that the image data of the last line is introduced by the third microprogram, and the image data of the last line and the image data of the first line are processed by the first microprogram, thereby to compress the image data. That is to say, microprograms of a variety of forms can be employed for the present invention.

What is claimed is:

1. A visual information processing apparatus comprising: first means for successively producing digitized two-dimensional image data in a raster-scanning manner; second means for generating a coordinate (X, Y) of a scanning point of said two-dimensional image; third means which is provided with a plurality of microprograms and which executes a microprogram corresponding to a value of said coordinate Y, thereby to process the image data which is produced by said first means; and fourth means for starting said third means when a value of said coordinate X is in agreement with a particular value $X_I$; wherein said image data is processed for every particular image region.

2. A visual information processing apparatus according to claim 1, wherein said third means comprises; memory means for storing said plurality of microprograms; sequencer means for successively reading, from said memory means, micro-instructions which constitute a microprogram that corresponds to a value of said coordinate Y; and arithmetic means which is controlled by said micro-instructions that are read out, and which processes the image data that includes outputs from said first means.

3. A visual information processing apparatus according to claim 2, wherein said sequencer means comprises; means which generates an initial address of a microprogram that corresponds to a value of said coordinate Y; means which successively generates micro-instruction addresses that follow said initial address; and means which is controlled by microinstructions that have been read out already to select any one of said addresses, thereby to read a microinstruction from said memory means.

4. A visual information processing apparatus according to claims 1, 2 or 3, wherein said third means includes means for selecting said microprogram in response to a value of least significant digits which represent a value of each of the coordinates Y within a predetermined range that is given by said second means, so that the image data is processed for each of the image regions that are obtained by dividing the two-dimensional image into grid-like blocks in the directions X and Y.

5. A visual information processing apparatus according to claims 1, 2 or 3, wherein said fourth means comprises means which produces a starting signal when the coordinate X produced from said second means is in agreement with a particular value $X_I$ and fifth means which sets the particular value $X_I$ to said means and which controls said starting signal that is fed to said third means.

6. A visual information processing apparatus according to claim 5, wherein said fifth means includes means which introduces and processes the results that are obtained by processing the image data by said third means for each of the image regions.

* * * * *